UNITED STATES PATENT OFFICE.

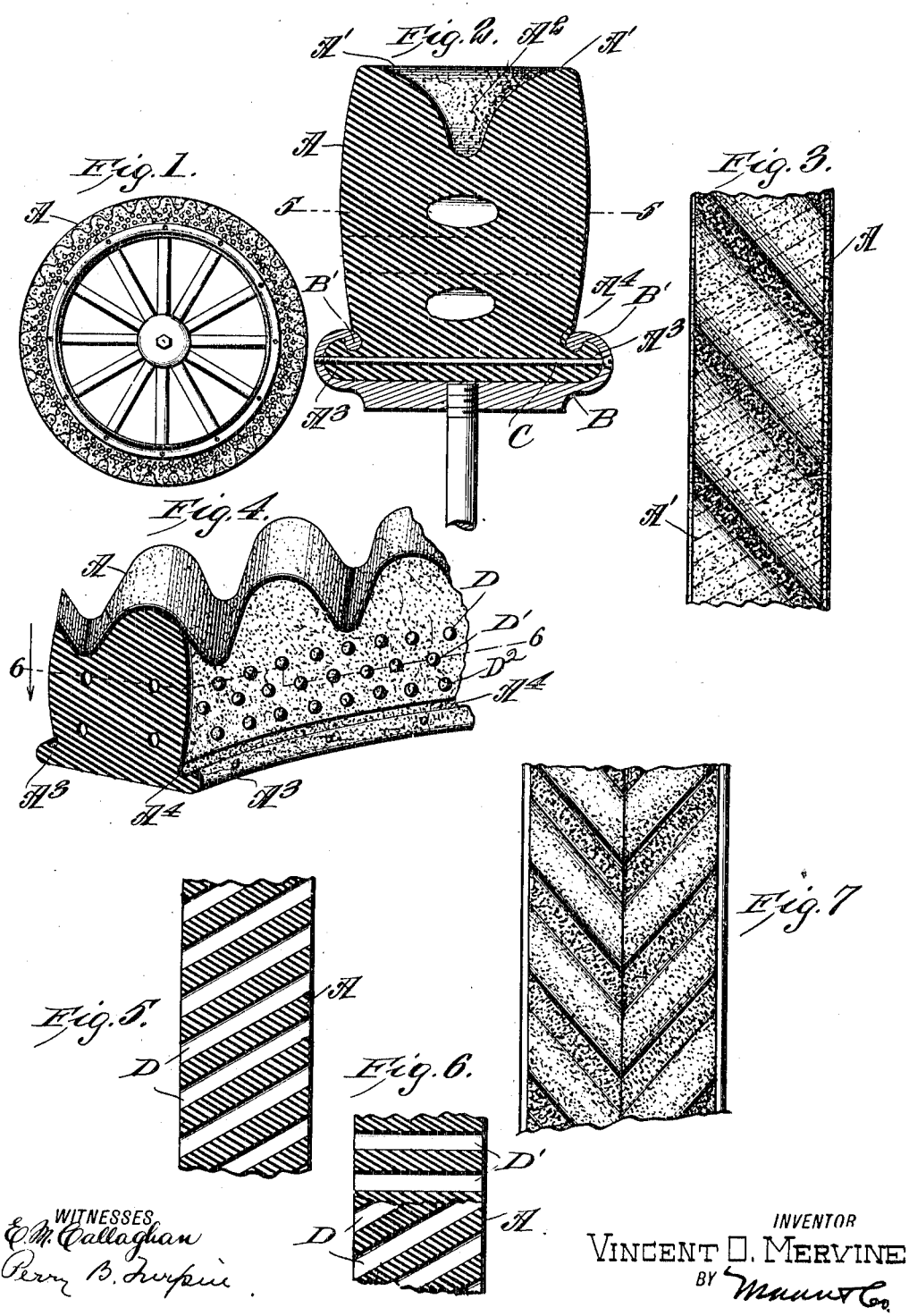

VINCENT O. MERVINE, OF STROUDSBURG, PENNSYLVANIA.

TIRE.

986,930.  Specification of Letters Patent.  Patented Mar. 14, 1911.

Application filed March 6, 1909. Serial No. 481,622.

*To all whom it may concern:*

Be it known that I, VINCENT O. MERVINE, a citizen of the United States, and a resident of Stroudsburg, in the county of Monroe and State of Pennsylvania, have made certain new and useful Improvements in Tires, of which the following is a specification.

This invention is an improvement in resilient tires for use on the wheels of motor cars and similar vehicles; and the invention consists in certain novel constructions, combinations and arrangements of parts as will be hereinafter described and claimed.

In the drawing Figure 1 is a side view of the wheel provided with a tire embodying my invention. Fig. 2 is a transverse section thereof. Fig. 3 is a top plan view or face view of a portion of a tire. Fig. 4 is a detail perspective view of a portion of a tire. Fig. 5 is a detail circumferential section on about line 5—5 of Fig. 2. Fig. 6 is a section on about line 6—6 of Fig. 4, and Fig. 7 is a face view of a tire having a double fluted face.

In carrying out my invention the tire A is resilient being preferably made of rubber as usual in this class of cushion tires, and a feature of my invention is the diagonally disposed resilient flutes or ribs $A'$ on the outer face of the tire and separated by the intervening diagonal grooves $A^2$, which space them apart. The ribs $A'$ are so formed that the adjacent ribs overlap each other so that there is practically a continuous bearing surface at the outer edges of the ribs throughout the circumference of the tire, and the ribs being resilient produce a superior cushioning action in the practical use of the invention. It will be noticed that the ribs are arranged diagonally to the circumference of the tire and that the tread surfaces and the spaces intervening the ribs are curved, with the lines of the recesses and of the ribs united by gradual curves, thus securing the greatest resilience and avoiding abrupt angles such as would tend to cause a fracture or breakage of the rubber by the flexion of the ribs in the use of the invention.

At its inner side the tire A is provided with the lateral circumferential flanges $A^3$, and with circumferential grooves $A^4$ in the outer faces of said flanges near their inner edges, see Figs. 2 and 4. These flanges $A^3$ fit within the clencher rim B and the free edges of said rim at $B'$ fit in the grooves $A^4$ as best shown in Fig. 2.

The tire is perforated transversely near its inner edge with the perforations extending laterally through the flanges B for the passage of fastening pins C, which are shown as screws in Fig. 2 of the drawing, and which operate to positively lock the inner flanged portion of the tire within the clencher rim.

Channels D, $D'$ and $D^2$ are formed transversely through the body of the tire between the flanges $A^3$ and the outer ribbed face of the tire and are preferably arranged in circular series with the channels $D'$ between the series of parallel channels D and $D^2$ and alternating therewith or arranged in staggered relation to the channels D and $D^2$ as shown.

It is preferred to dispose the channels D and $D^2$ diagonally and approximately at right angles to the ribs $A'$, while the channels $D'$ preferably extend transversely the tire at a right angle to the direction of length thereof as shown in Fig. 6. This special construction is preferred, as it operates to increase the resilience of the wheel without materially weakening the same by the production of the transverse channels. It will be noticed, however, that my invention includes in the embodiment illustrated channels extending from side to side of the tire in connection with the diagonally disposed face ribs $A'$ the whole operating to produce a resilient face for the tire, and also to increase the cushioning action by the transverse channeling which is shown as produced both diagonally to and at a right angle to the direction of length of the tire. For very wide wheels such as those employed on heavy trucks it may be desirable to combine two of the tires such as shown in Fig. 3, in a double tire as illustrated in Fig. 7, and in such case the ribs of the two sections may be disposed at reverse angles, the tire being supplied with flanges at its inner edges for engagement by the clencher rim, and being also channeled transversely as described in connection with the single form of tire shown in Figs. 1 to 6.

I claim—

1. A tire for wheels substantially as herein described formed of resilient material, and having at its outer face diagonally disposed ribs with the ends of the ribs lapping past the adjacent ends of the succeeding ribs the tire being provided at its inner side with lateral circumferential flanges grooved in their outer faces at their inner edges, and having transverse openings formed through the flanged portion of the tire for fastening pins, the tire being provided between its flanged inner portion and its outer ribbed face with a plurality of series of transverse channels including outer and inner diagonally disposed channels arranged approximately at a right angle to the ribs, and intermediate channels between said outer and inner diagonal channels and extending transversely through the tire at approximately a right angle to the direction of length of the tire all substantially as and for the purposes set forth.

2. A wheel tire of resilient material having at its outer face diagonally disposed resilient ribs, the body of the tire being provided with a plurality of series of transverse channels including outer and inner diagonally disposed channels arranged approximately parallel to each other, and intermediate channels between said outer and inner diagonal channels and extending transversely through the tire at approximately a right angle to the direction of length of the tire.

3. A resilient wheel tire of rubber having its tread surface flat from side to side and formed with ribs extending diagonally to the circumference of the tire, the tread surfaces of the ribs and the spaces between the ribs being curved with the lines of curvature of the recesses and of the ribs united by gradual curves, the tire being provided with transverse channels disposed diagonally to the circumference thereof, substantially as set forth.

4. A wheel tire of resilient material, provided with a plurality of series of transverse channels, including outer and inner diagonally disposed channels, and channels intermediately between its outer and inner channels and extending at approximately a right angle to the direction of length of the tire, all substantially and for the purposes set forth.

5. A resilient wheel tire of rubber having its tread surface formed with ribs disposed diagonally to the circumference of the tire and having their tread surfaces and the spaces or recesses intervening the same curved, with the lines of the recesses and of the ribs united by gradual curves, the tire being provided with a plurality of series of transverse channels including outer and inner diagonally disposed channels and intermediate channels between said outer and inner channels substantially as set forth.

VINCENT O. MERVINE.

Witnesses:
SOLON C. KEMON,
PERRY B. TURPIN.